April 3, 1928.                     1,664,920
F. E. GILMORE
FIRE STILL AND OIL TREATER
Filed Feb. 4, 1926          2 Sheets-Sheet 1

INVENTOR
FORREST E. GILMORE
By
ATTORNEY

April 3, 1928.  1,664,920

F. E. GILMORE

FIRE STILL AND OIL TREATER

Filed Feb. 4, 1926  2 Sheets-Sheet 2

INVENTOR
FORREST E. GILMORE
By
ATTORNEY

Patented Apr. 3, 1928.

1,664,920

UNITED STATES PATENT OFFICE.

FORREST E. GILMORE, OF LOS ANGELES, CALIFORNIA, ASSIGNOR TO FORREST E. GILMORE COMPANY, OF PORTLAND, OREGON, A CORPORATION OF DELAWARE.

FIRE STILL AND OIL TREATER.

Application filed February 4, 1926. Serial No. 85,852.

As may be inferred from the above title, this invention relates to apparatus capable of fractionating oils or other liquids, and it is an especial object of this invention to provide, at low cost, simple and highly efficient means and methods suitable for use in, for example, the distillation of gasoline from an absorption oil.

It is a further object of this invention to provide means and methods suitable for use in the distillation of gasoline, kerosene, or similar products from crude oils or crude oil products.

It is a further object of this invention to provide new and advantageous means and methods for dehydrating and otherwise conditioning crude oil or the like containing water, whether or not in the form of a comparatively stable emulsion, and/or bottom settlings, or the like.

It is a general object of my invention to provide improved and easily controllable means for separating, by evaporation, a predetermined fraction of any liquid; and preferred embodiments of my invention may comprise novel sectional heaters, provided with internal stacks or flues and surrounded by concentric casings which serve to define liquid chambers,—these chambers being preferably separated by transverse partitions so constructed as to provide for variations in expansions, as the same may result from differences in temperature.

It is a further object of my invention to associate with heaters of the general character referred to novel evaporators correspondingly subdivided, said heaters and evaporators being preferably connected in such manner as to permit the passage of an introduced oil, or the like, first through an upper chamber having a comparatively low temperature, then through a corresponding subdivision or compartment of the associated evaporator, an unevaporated residue being advanced, from a point near the bottom of the mentioned upper compartment of the evaporator, to a lower and hotter section of said heater,—passing therefrom to a low and comparatively hot compartment or subdivision of the evaporator.

It is a further object of this invention to provide heaters of the general character referred to with means such as central columns, formed of a metal or a refractory clay, or the like, serving as an aid in the lateral radiation of heat from flames or flue gases and in the maintenance of a desired temperature.

It is a further object of my invention to provide heaters comprising central flues or stacks with means such as lateral fins extending into the liquid to be heated, to facilitate an exchange of heat; and it is a further object to provide a construction favorable to the concurrent use of said fins and the use of expansion joints of the general character mentioned.

It is a further object of this invention to provide evaporators of the general character referred to with baffling elements of an advantageous type, favorable to exposure of extensive surfaces of the treated liquid; and, in preferred embodiments of my invention, the respective subdivisions or compartments of the evaporating members referred to may be separated by partitions respectively provided with upwardly extending tubular elements, to permit an upward movement of vapors, although preventing direct downward movement of residues.

It is a further object of my invention to provide organizations of the general character referred to in which a considerable number of heaters, each of which may comprise a plurality of sections disposed one above another, may be associated with a single evaporating column,—this column being preferably subdivided in the described manner and optionally provided not only with a bottom outlet for residues but with a dephlegmator or knock-out column (of any preferred known type) through which escaping vapors are compelled to pass; and any or all of the respective elements referred to may be provided not only with thermal insulation, in a known manner, but with thermostatic control means and/or means assuring the maintenance of a predetermined internal pressure.

Other objects of my invention may be best appreciated from the following description of illustrative embodiments thereof, taken in connection with the appended claims and the accompanying drawings, in which Fig. 1 is an elevational view of a typical, simple embodiment of my invention, with parts broken away.

Figure 1:
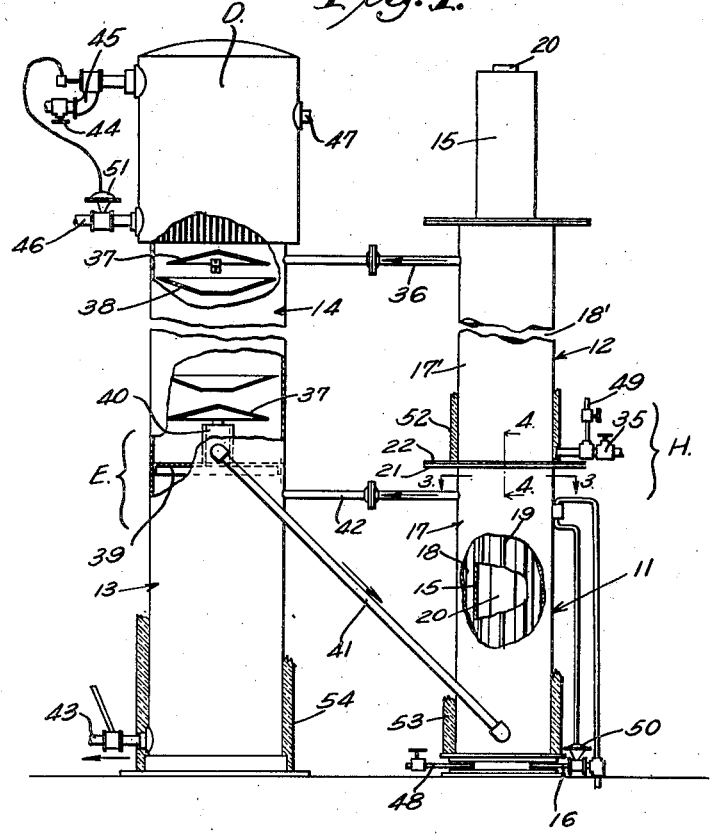
Figure 4:
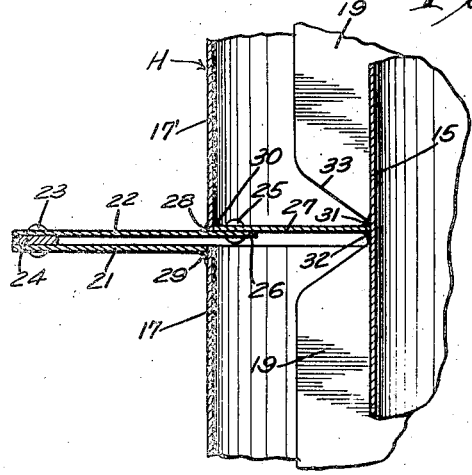
Fig. 4 is a sectional detail view, on an enlarged scale, taken substantially as indicated by the lines 4—4 of Figs. 1 and 2.
Figure 3:
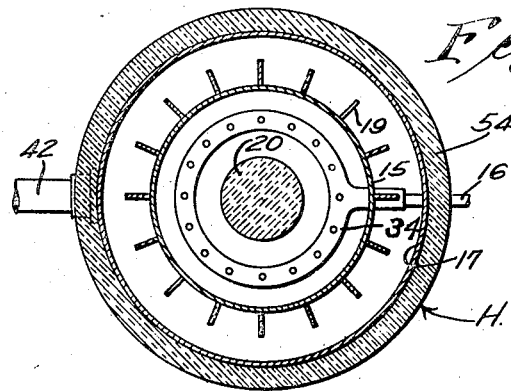
Fig. 3 is a transverse sectional detail view, on a somewhat enlarged scale, taken substantially as indicated by the lines 3—3 of Figs. 1 and 2.

Referring to the details of that specific embodiment of my invention illustrated in Figs. 1, 3 and 4, H is a heating column or still comprising a lower section 11 and an upper section or sections 12; and E is an evaporator column comprising a lower section 13 and an upper section or sections 14, the uppermost of these sections being shown as surmounted by a knock-out column or dephlegmator D.

The heating column H may comprise an inner casing 15, serving as a stack or flue for any suitable burner (to which a liquid or gaseous fuel may be fed by means such as a valved pipe 16) the casing 15, or its equivalent, being adapted to cooperate with an outer casing or casings 17, 17′ in defining chambers 18, 18′, adapted to receive the oil or other liquid to be treated. I consider it advantageous to provide the inner casing 15, or its equivalent, with means such as radiating fins 19, facilitating a heat exchange, and/or with a central column 20, which may be formed of a metallic or refractory composition, or of any suitable material having a high specific heat, this column, when employed, being designed to aid in the radiation of heat toward the casing 15 and to aid in the maintenance of a substantially uniform high temperature, and/or cause a reignition of a combustible fluid, in case of momentary extinction of flame.

Figure 2:
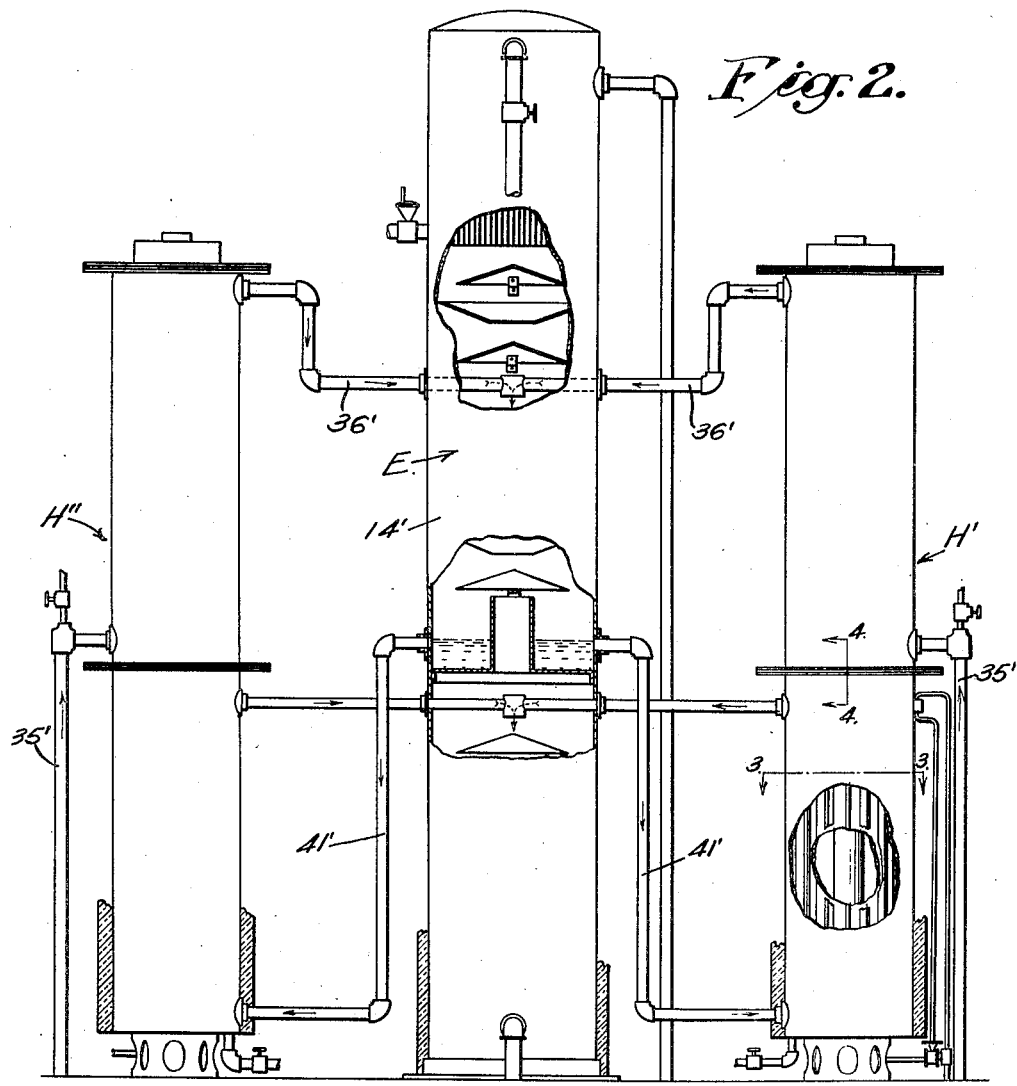
Fig. 2 is a similar view, but showing a somewhat more complicated installation,—one evaporating tower being used in conjunction with a plurality of heating towers or stills.

Two or three or more heater sections of the general character described may be superimposed, in the general manner illustrated in Figs. 1 and 2, and these sections may be separated, as to flow of oil, and connected, as to structural unity, in the general manner indicated in Fig. 4. That is to say, a lower casing section 17 and an upper section 17′ may be respectively provided with external annular flanges 21 and 22, secured together near their outer edges, as by means of rivets 23, a peripheral strip 24 being optionally interposed; and one or the other of the mentioned flanges, as the upper flange 22, may be secured additionally, as by rivets 25, shown as extending through an inward projection 26 thereof, to inner partitioning elements 27, shown as extending between the casing section 17′ and the stack wall or inner casing 15. As shown, the respective flanges may be secured to the mentioned casings (when not initially integral therewith) by welding, as at 28, 29, 30, 31 and 32; and the radial fins 19, or their equivalent, which may be similarly secured to the inner casing 15, may be interrupted and/or provided with beveled ends, as at 33, in the regions of the partitions 27, or their equivalents.

Assuming that the lowest heater section 17 is, by reason of its proximity to a suitable burner 34 (shown diagrammatically, in Fig. 3 only, as connected with the pipe 16 and placed at or near the bottom of said section) hotter than the superimposed section or sections, I prefer to introduce the oil or other liquid to be treated, as through a valved oil inlet pipe 35, at a point near the bottom of an upper heater section 12, the heated oil being permitted to escape, as through an elevated outlet 36, from a cooler section of the described heating column into a comparatively cool section of the associated evaporating column.

The evaporating column E, referred to as comprising a lower section 13 and an upper section or sections 14, may be interiorly provided, in one or more sections thereof, with interior baffles in the form of conical or frusto-conical plates of the general character indicated at 37 and 38. These plates are shown as of two types,—the upwardly convex plates 37 being of lesser diameter, and entire, whereas the downwardly convex plates 38, wide enough to catch any drip from the edges of the upper or intervening plates 37, are provided with central openings,—the drip from each plate 38 falling onto the convexity of the plate 37 immediately therebelow.

The respective sections of each evaporating column may be separated by means such as interposed apertured plates 39, each of these plates having one or more apertures provided with an upwardly extending tubular member 40, serving to permit an upward movement of vapor, although preventing direct downward movement of condensed or residual liquid; and any condensed or residual liquid may be passed from an upper section of the described evaporating column into a lower section of an associated heater by means such as a diagonal or down pipe 41,—connecting the bottom of an evaporator section with the bottom of a hotter heater section.

After passing through the lowest and hottest heater section, as the section 11, the oil or other liquid treated may advance, as by a substantially horizontal pipe 42, into the top of the lowest and hottest evaporator section 13, vapors there liberated (as by passing the oil or other liquid over baffle plates of the general character described) being permitted to escape through the tubular member 40, whereas the uncondensed residue may be drawn off through an outlet at any preferred level,—as through a valved pipe 43, at or near the bottom of the lowermost evaporator compartment. The valve in this pipe may be optionally controlled by the interior liquid level, as through a float, not shown; and vapors escaping from the treated oil or from liquid, at any level within any of the mentioned evaporating compartments, may be reabsorbed by any condensed or residual liquid flowing over the surfaces of the described baffle plates, or their equivalents; and any desired fraction of the vapors rising in the manner described may be immediately refluxed by means such as the mentioned knock-out column or dephlegmator D, shown as superimposed upon the uppermost evaporating section 14. Any desired pressure may be maintained, as by the interposition of a valve 44 in a vapor outlet 45, and the temperature within the knock-out column or dephlegmator D may be controlled in any suitable way, as by a predetermination of the rate of admission of a cooling liquid to the inter spaces communicating with a valved inlet pipe 46 and an overflow outlet pipe 47.

It will be obvious that the above described construction provides what is known as a counter flow action in the heating of the oil or other liquid, the cold oil coming in contact with an upper and comparatively cooler portion of the flue extending through the superimposed heaters constituting a column, and only an unevaporated residual portion of the oil being brought into contact with the hottest portion of the described flue; and the knock-out tower or dephlegmator at the top of the evaporator, when used, need not be of any special design, but may be a mere tubular cooler; and steam may be introduced, as by valved pipes 48, into any compartment or section of either the described heaters or the described evaporators; or, if preferred, a small amount of water may be introduced, as by valved pipes 49, into the liquid going to the described heaters,—so that the water will evaporate and give desired effects, during its passage through the described path. If the temperature of a knock-out tower D, or its equivalent, is kept below the boiling point of water, any introduced steam or water obviously will condense therein and drop back into the upper compartment of the evaporator E, working on downward and forming a certain amount of steam in at least the upper chamber of said evaporator,—thus helping in the evaporation of the liquid treated.

The organization illustrated in Fig. 2 may be substantially like that already described, except as any desired plurality of heating columns H′ and H″ are associated with a single evaporating tower E′, the respective connecting pipe 36′ being brought in either at different elevations (to correspond with differences in the materials fed through inlet pipes 35′) or at a common level,—although the inclined or intermediate down pipes 41′ are preferably connected with the upper section or sections 14′ of the heating columns E′ at a common level.

The principles involved in the use of an organization of the general character illustrated in Fig. 2 being the same as already set forth in connection with the description of Figs. 1, 2 and 4, I emphasize in conclusion, the fact that either of the described embodiments of my invention is capable of a wide variety of uses, the essential advantages in the more complicated embodiment such as are illustrated in Fig. 2, being the increased capacity and efficiency thereof and the possibility of treating simultaneously, and in an economical manner, petroleum oils or products, or the like, differing somewhat in their composition and/or initial boiling points,—little expense being incurred for foundations.

Any of the fluid-containing members referred to may, if desired, be provided with somewhat as thermostatic control means, somewhat as diagrammatically suggested at 50 and 51 (as applied respectively to a fuel inlet pipe and a cooling liquid inlet pipe) and/or with insulation, as suggested at 52, 53 and 54, of Fig. 1.

Although I have herein described alternative complete embodiments of my invention, it will be appreciated not only that various features thereof may be independently used, but also that numerous additional modifications might be devised, by those skilled in the art to which this case relates, without the slightest departure from the spirit and scope of my invention, as the same is indicated above and in the following claims.

I claim as my invention:

1. In a fluid heating and separating organization of the general character described: a heater comprising a substantially vertical central flue constituting an inner wall of a chamber to receive the liquid to be treated; a burner near the bottom of said flue; means for introducing said liquid near the bottom of said chamber; and means for conducting the heated liquid from said chamber, at a higher level, to an associated evaporator, said inner wall being provided with outwardly projecting fins, radially disposed in vertical planes to facilitate heat exchange.

2. Fluid heating and separating means of the general character described comprising: a heater including a substantially central vertical flue constituting an inner wall common to a plurality of superimposed chambers which are separated by transverse partitions; a burner near the bottom of said flue; a subdivided evaporator; and means for conducting the liquid to be treated through an upper chamber of said heater, then through an upper subdivision of said evaporator, then through a lower chamber of said heater; and then through a lower subdivision of said evaporator.

3. An organization of the general character defined in claim 2 in which the top of said evaporator is provided with a refluxing tower and the bottom thereof is provided with means for the withdrawal of a residue.

4. An organization of the general character defined in claim 2 in which the subdivision of said evaporator is effected by means comprising a transverse partial partition which is provided with an opening carrying a tubular member, to permit an upward movement of vapors while preventing direct downward movement of liquids therethrough.

5. In means of the general character described, a sectional heater comprising a central flue surrounded by separate sections of an outer casing, said sections being respectively secured to annular outer horizontal flanges which are fastened together near their outer edges, one of said sections being secured to an intervening annular partitioning element which extends to said central flue.

6. An organization of the general character defined in claim 5 in which said central flue is provided with heat-exchanging fins.

7. An organization of the general character defined in claim 5 in which said central flue is provided with heat-exchanging fins which are interrupted in the region of said partitional element.

In testimony whereof, I have hereunto set my hand at Los Angeles, California, this 23rd day of January, 1926.

FORREST E. GILMORE.